_United States Patent_ [19]

Socola et al.

[11] Patent Number: 4,576,108

[45] Date of Patent: Mar. 18, 1986

[54] APPARATUS FOR APPLYING VISCOUS SEASONING EVENLY TO TUMBLING FOOD ARTICLES

[75] Inventors: Helen M. Socola, Irving; Michael G. Topor, Carrollton, both of Tex.

[73] Assignee: Frito-Lay, Inc., Dallas, Tex.

[21] Appl. No.: 657,130

[22] Filed: Oct. 3, 1984

[51] Int. Cl.⁴ ............................................... B05C 5/00
[52] U.S. Cl. ........................................ 118/19; 118/24; 118/303
[58] Field of Search ................... 118/19, 24, 303, 315

[56] References Cited

U.S. PATENT DOCUMENTS

| | | | |
|---|---|---|---|
| 430,707 | 6/1890 | Strahan | 118/315 X |
| 558,987 | 4/1896 | Ruger | 118/315 X |
| 2,601,355 | 6/1952 | Wyss et al. | 118/303 X |
| 2,672,844 | 3/1954 | Flint | 118/315 |
| 3,089,824 | 5/1963 | Wurster | 167/82 |
| 3,253,944 | 5/1966 | Wurster | 117/300 |
| 3,407,785 | 10/1968 | Higgins | 118/303 X |
| 3,548,782 | 12/1970 | Bergquist et al. | 118/20 |
| 3,903,333 | 9/1975 | Shirley, Jr. et al. | 118/19 X |

_Primary Examiner_—John P. McIntosh
_Attorney, Agent, or Firm_—Bernard, Rothwell & Brown

[57] ABSTRACT

An apparatus for applying a viscous slurry of seasoning or flavoring material to a moving tumbling bed of snack food and a tumbler drum utilizes a slurry pipe with a plurality of space nozzles and a companion air manifold with a plurality of corresponding air nozzles positioned adjacent the slurry nozzles to direct and atomize the slurry. The pipe and manifold are adjustable together, both axially and rotatably to direct and position the atomized spray of slurry.

3 Claims, 2 Drawing Figures

APPARATUS FOR APPLYING VISCOUS SEASONING EVENLY TO TUMBLING FOOD ARTICLES

BACKGROUND OF THE INVENTION

1. Field of the Invention

This invention relates to an improved seasoning apparatus for applying a viscous seasoning slurry uniformly to particulate snack food material moving in a tumbling bed.

2. Prior Art

The application of seasoning and flavoring materials to particulate snack foods while the foods are being tumbled in a tumbler drum in order to achieve a uniform coating of such foods is commonly known and widely practiced.

Typically, seasoning is applied while the food pieces are tumbling in a commercially available tumbling drum. The tumbling drum is an open-ended cylindrical rotatable drum set at an angle to a horizontal plane so that particles of material fed into the upper end of the drum will move by gravity toward the lower end of the drum and will tumble on itself while the drum is rotated. A pipe or similar distribution apparatus extending inside the drum above the level of material feeds seasoning or flavoring material which drops by gravity onto the tumbling bed of particles.

When utilizing a seasoning or flavoring which is a viscous liquid, a number of problems are encountered. Such viscous seasonings could, for example, include oil, cheese and salt such as put on Cheetos ® puffed snack food products. There is a serious problem in applying the viscous liquid as a uniform coating on the food pieces as they tumble within the drum. If the seasoning or flavoring does not get uniformly distributed on the product the product quality is poor and significant amounts of product would not pass quality control tests thus resulting in economic waste. Another problem was coverage of all pieces with seasoning. In order to be assured that the seasoning is applied to all of the food particles, an excess of seasoning has been used, thus contributing to economic waste and poor quality of those particles which are overseasoned.

Previously, viscous material was dribbled out of holes in a pipe onto tumbling product and the problem of uniform distribution, although apparent, was a fact that workers in the art lived with for many years.

SUMMARY OF THE INVENTION

This invention relates to a method and system for applying a viscous slurry of seasoning or flavoring material to a moving tumbling bed of snack food in a tumbling drum utilizing improvements to provide a more uniform coverage of the seasoning on the tumbling bed of material. The improvements include providing a pipe for the heated viscous slurry with a plurality of outlet nozzles along the length of the pipe and a companion air manifold to supply compressed air and to direct the compressed air onto the slurry exiting from the manifold nozzles so as to atomize the slurry into fine particles which rain down on the bed of moving tumbling snack food. The slurry pipe and air manifold are adjustable as a unit both axially and radially for adjusting the area of application of the atomized slurry.

DETAILED DESCRIPTION OF THE PREFERRED EMBODIMENT

Figure 1:
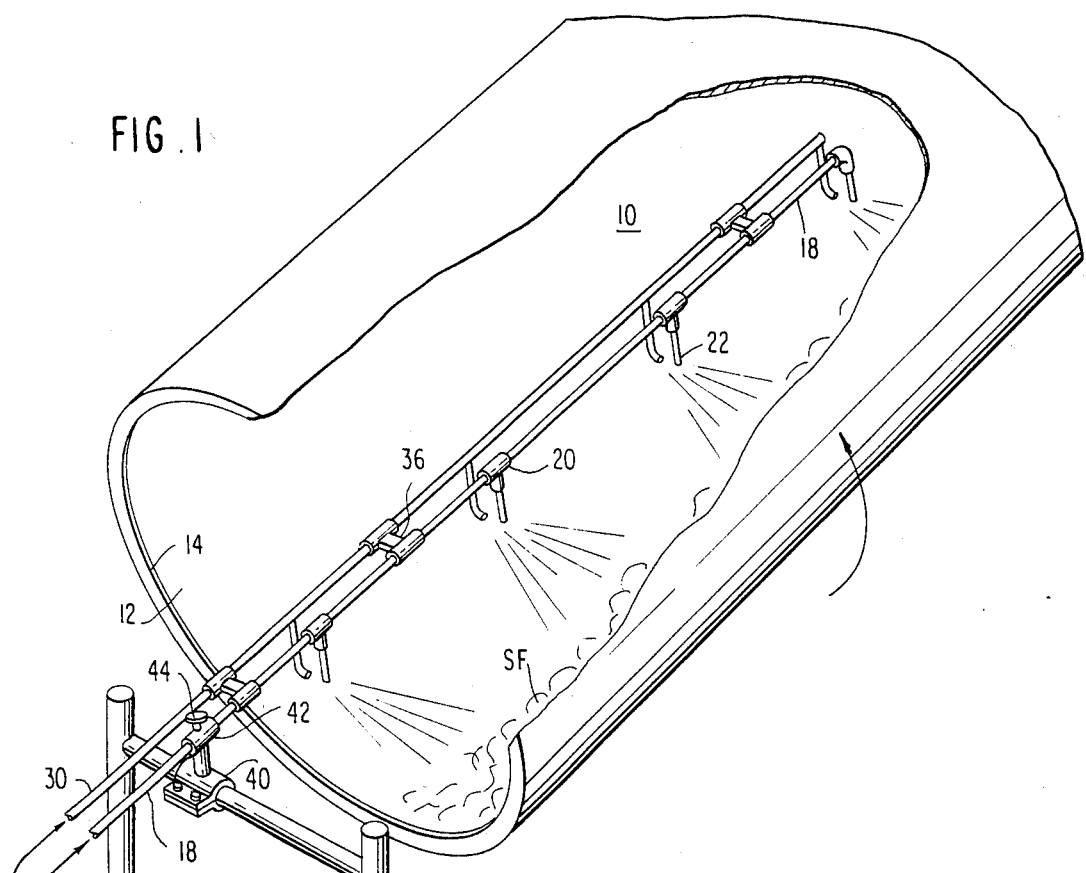
FIG. 1 is a perspective view with portions broken away and portions shown schematically of the apparatus and system of this invention which also illustrates the method of this invention.

This invention provides a system wherein a viscous slurry of flavoring material is reduced to fine droplets or a mist, which rains downward to flavor snack food products tumbling in a rotating drum.

A hollow cylindrical tumbling drum 10 of the type commonly used in the snack food seasoning art is of conventional shape that is it is hollow drum open at both ends including an open outlet end 12 and is rotated about its axis by means not shown while positioned with its axis at an angle to a horizontal plane. A small discharge control lip 14 may be provided at the outlet end 12.

As is known in the art, snack food to be seasoned or flavored is fed into an upper end of the drum and as the tumbling drum 10 rotates, the snack food tumbles and moves by gravity down to the lower end where it exits the drum over the lip 12. This is as well known and conventionally practiced in the art.

In accordance with the present invention, the heated seasoning slurry supply, which also existed in the prior art, is connected to a pipe 18 which extends into the drum a predetermined distance. The pipe 18 has positioned along its length a plurality of connectors 20 (all T-connectors except the end L-connector) for connecting a plurality of nozzle tubes 22. Each nozzle tube 22 has an exit opening 24.

The viscous slurry is supplied under pressure, which pressure itself is varied to adjust the total slurry flow rate. The desired pressure may vary, depending upon such factors as slurry viscosity, concentration of flavoring ingredients in the slurry, and throughput of product being flavored.

Snack food-flavoring slurries of any suitable viscosity which are capable of dispersion into fine droplets can be used with the present invention. As nonlimiting examples, slurries having viscosities at 110° F. of from about 120 centipoise to over 560 centipoise have been used with the invention.

The desired flow rate of the slurry may vary depending upon the concentration of flavoring ingredients in the slurry, the throughput of the product being flavored, the desired flavor intensity of the final product, and the like. As non-limiting examples, flow rates of from about 275–480 lb. slurry/hr. have been used with the invention.

The size of the exit openings 24 may vary along the length of the tube in order to generally balance the flow from the nozzles, or in order to, for example, increase the flow rate or decrease flow resistance through a particular nozzle to compensate for potential pressure drop at that nozzle. A pressure drop may result at a nozzle located at a greater distance from the slurry supply than other nozzles for obvious reasons. The nozzle tubes are constructed so that they may be easily and readily replaced with nozzle tubes having different size outlet openings, in order to vary the flow rate of the slurry, or in order to compensate for changes in slurry viscosity.

Figure 2:
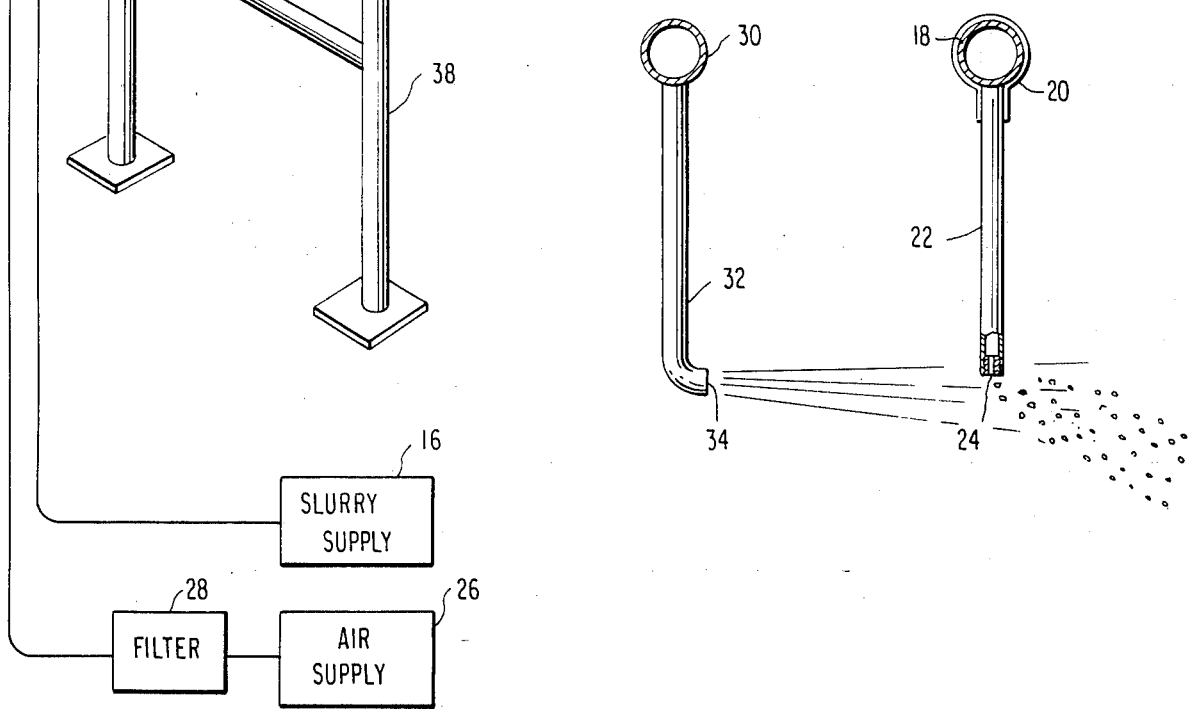
FIG. 2 is an enlarged sectional elevation showing the slurry and air manifold and nozzles thereon.

An air supply 26 provides a source of compressed air which flows through a filter 28 to an air manifold 30. The air manifold 30 is in the form of a tube which extends into the tumbler drum 10 parallel to and slightly spaced from the pipe 18. The manifold 30 has a plurality of air outlets 32, each of which has an opening 34 directed toward the opening 24 of the nozzle tubes 22 as shown, for example, in FIGS. 1 and 2. By virtue of air under pressure, the slurry exiting from nozzle 24 is finely atomized and in effect sprayed in the form of a mist or light rain onto the tumbling bed of snack food SF in drum 10.

Any suitable air pressure sufficient to reduce the slurry to fine droplets which rain downward in a snack-food tumbling drum may be used according to the invention. As non-limiting examples, air pressures of 35–40 p.s.i. have been used according to the invention with slurries having viscosities at 110° F. of from about 120 centipoise to about 566 centipoise, and flow rates of from about 275 lbs./hr. to about 480 lbs./hr. The air pressure may be adjusted to compensate for slurries of various viscosities and/or changes in slurry flow rate. In general, as slurry viscosity and/or slurry flow rate increases, increased air pressure is required to reduce the slurry to fine droplets.

A plurality of rigid tube connectors 36 connect the manifold 30 and the pipe 18 rigidly in their spaced apart relationship and to create a rigid pipe-manifold assembly 37 movable as a unit. A stand 38 of any convenient form is supplied as a support adjacent the lower end of the drum 10. A support bracket 40 is secured to the stand 38 for adjustably supporting the pipe-manifold assembly 37. The bracket 40 contains a tube clamp 42 with a clamping screw 44. With this arrangement the position of the entire seasoning assembly can be moved relative to the drum and the assembly can be inserted further into the drum or positioned lengthwise along the length of the drum. Further, the manifold 30 can rotate about the axis of the tube 18 to further direct the spray onto the tumbling drum.

The entire system is fabricated of lightweight stainless steel. The interchangeable slurry nozzles 22 provide a uniform flow and the adjustability features allow the slurry manifold to be adjusted axially and rotatably to best position the spray from the manifolds.

As a non-limiting, but specific example of the use of this invention, Cheetos ® brand snack food was seasoned by a viscous slurry of oil, cheese and salt (other seasoning materials could also be used such as barbeque seasoning). The viscocity of the slurry was about 180 centipoise at 110° F. Four replaceable nozzles 22 were utilized with outlets diameters of 3/16", 3/16", 3/16" and ¼" extending from the outer end to the interior of the drum. The pressure on the slurry was set to produce a total slurry flow rate of about 275 pounds per hour.

The air supply was at a pressure of about 35 pounds per square inch and the space between the outlet 34 of the air outlet tubes and the outet 24 of the nozzle 22 was about two inches.

Test results using this test set-up show that there is a statistically significant increase in the uniformity and consistency of seasoning distribution on the end product using the system of the present invention compared to previously known systems, and (probably as a consequence) the end product is perceived by consumers as better tasting.

Although specific embodiments have been described, other variations are possible and are within the spirit and scope of this invention as defined in the claims.

What is claimed is:

1. An apparatus for applying a viscous slurry of seasoning or flavoring material to a moving, tumbling bed of snack food in a tumbler drum, the apparatus comprising:
   (a) a reservoir containing the viscous material;
   (b) a slurry pipe connected to the reservoir and extending into the interior of the tumbling drum for carrying the viscous material;
   (c) a source of compressed air;
   (d) a conduit and manifold connected to the source of compressed air, the conduit and manifold extending into the interior of the tumbling drum parallel and adjacent to the slurry pipe;
   (e) slurry nozzles connected to the slurry pipe at spaced portions along the length thereof and inside the drum;
   (f) air nozzles connected to the air manifold at spaced portions thereon along the length thereof and inside the drum, the air nozzles being spaced apart from and directed toward streams of slurry exiting from the outlet of the slurry nozzles so that viscous slurry exiting from the slurry nozzles is atomized and dispersed by air from the air nozzles to spread the viscous slurry onto the tumbling, moving material in the drum in a relatively uniform fashion;
   (g) a mechanical means connecting the air manifold to the slurry pipe as a unitary assembly; and
   (h) a mechanical means allowing adjustment of the air manifold and slurry pipe assembly as a unit to position the same axially and rotatably relative to the slurry pipe axis for maximum affect within the tumbler drum.

2. A system as in claim 1 wherein the slurry nozzles on each of the outlets is a replaceable nozzle.

3. An apparatus as in claim 1 wherein the mechanical means allowing adjustment of the air manifold and slurry conduit comprises a pipe clamp connected to and supporting the slurry pipe to allow adjustment both axially and rotatably relative to the axis of the slurry pipe.

* * * * *